United States Patent [19]

Manschot et al.

[11] 4,051,578

[45] Oct. 4, 1977

[54] COMBINATION HANGER AND CLAMP MEMBER FOR BEDSIDE DRAINAGE BAG

[75] Inventors: James G. Manschot, Mukwonago; Byron L. Mather, Milwaukee; Thomas W. Balistreri, Hales Corners, all of Wis.

[73] Assignee: Plastronics, Inc., Milwaukee, Wis.

[21] Appl. No.: 644,534

[22] Filed: Dec. 29, 1975

[51] Int. Cl.$^{2}$ .............................................. F16G 11/00

[52] U.S. Cl. .......................................... 251/4; 24/130

[58] Field of Search ............... 24/73 HR, 150, 73 AB, 24/73 PB, 143 B, 81 B, 81 F, 81 TH, 73 AS, 73 B, 130, 264; 248/95, 215, 340, 75; 251/4

[56] References Cited

U.S. PATENT DOCUMENTS

| | | | |
|---|---|---|---|
| 2,253,444 | 8/1941 | Muller | 248/95 |
| 3,237,624 | 3/1966 | Jinkens | 248/95 X |
| 3,374,509 | 3/1968 | Logan et al. | 251/4 X |
| 3,529,598 | 9/1970 | Waldman | 248/95 |
| 3,534,738 | 10/1970 | Huck | 248/95 |
| 3,765,060 | 10/1973 | Sharick | 24/129 B |

FOREIGN PATENT DOCUMENTS

| | | | |
|---|---|---|---|
| 149,570 | 12/1919 | United Kingdom | 248/215 |

*Primary Examiner*—Paul R. Gilliam

*Assistant Examiner*—Kenneth Dorner

*Attorney, Agent, or Firm*—Michael, Best & Friedrich

[57] ABSTRACT

A one-piece combination hanger and clamp member for a drainage bag having an inlet tube connected to the top portion of the bag. The hanger clamp member is comprised of a bag retaining portion, a hanger clamp portion and a tube retaining portion. The bag retaining portion has an upright U-shape and is adapted to engage and support the drainage bag in a substantially vertical hanging position. The hanger clamp portion is integral with and extends from one leg of the bag retaining portion. The hanger clamp portion has an inverted U-shape adapted for hanging engagement with a support member and also has an elongated slot therein extending from one leg thereof to the other leg thereof with said slot tapering inwardly at one end thereof to a narrow clamping slot in which the inlet tube can be forced to thereby clamp it shut. The tube retaining portion is comprised of a lip integral with and extending from the other leg of the U-shaped bag engaging portion. The lip has a circular opening therein and a cutout portion at the end thereof through which the inlet tube can be forced and retained in the opening in a substantially vertical position when the drainage bag is in its vertical hanging position.

4 Claims, 6 Drawing Figures

COMBINATION HANGER AND CLAMP MEMBER FOR BEDSIDE DRAINAGE BAG

BACKGROUND OF THE INVENTION

This invention relates to a bedside drainage collection bag and more particularly to a combination hanger and clamp member preventing urine backflow and back pressure for such a bag. In prior constructions known to applicant the structure for supporting the bag in a hanging position and the structure for shutting off backflow and back pressure to the inlet tube was separate, there being no inter-relationship between them. In the present invention a one-piece member performs both the function of hanging and controlling flow through the inlet tube and in addition such functions have been inter-related so that when the tube is positioned in its clamped position, the member will not perform its support function in a normal manner and thus the chances of the operator inadvertently placing the drainage bag into use with the inlet tube restricted is substantially eliminated.

SUMMARY OF THE INVENTION

A combination hanger and clamp member for a drainage bag having an inlet tube connected to the top portion of the bag including a bag retaining portion adapted to engage and support the drainage bag in a substantially vertical hanging position and a hanger clamp portion integral with and extending from the bag retaining portion. The hanger clamp portion is in the form of an inverted U-shaped body adapted for hanging engagement with a support member. The body portion has an elongated slot therein extending from one leg thereof to the other leg thereof. The slot is wide enough to freely accommodate the inlet tube therein and in addition the slot tapers inwardly at one end thereof to a narrow clamping slot in which the tube can be forced. When the tube is positioned inside the clamping slot, it will be restricted to thereby effectively prevent urine backflow and back pressure therethrough. In addition when the tube is in its clamped position, it will extend across the U-shaped body portion of the hanger member to thereby effectively prevent the unit from being inadvertently placed in its operable hanging position while the tube is still clamped shut.

DESCRIPTION OF THE PREFERRED EMBODIMENT

Figure 1:
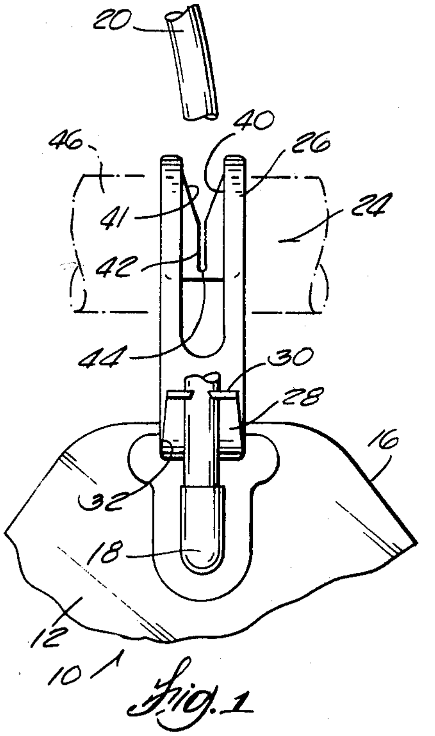
FIG. 1 is a front elevation view of a bedside drainage bag equipped with the combination hanger hook and clamp member of the present invention, with the inlet tube in its operative or drainage position.

Referring to the drawings in detail, FIG. 1 shows a bedside drainage bag 10 of a type normally used in a urinary collection system. Bedside drainage bag 10 is preferably made of two sheets of polyvinyl chloride plastic 12, 14 which are sealed to each other around the peripheral edges thereof as at 16, preferably by an electronic welding procedure to provide a sealed container. The drainage bag is provided with an inlet fitting 18 having a tube 20 connected thereto for conducting the flow of fluid into the bag. Fitting 18 and tube 20 are also preferably made from polyvinyl chloride material.

The combination hanger hook and clamp member is referred to generally by reference numeral 24 and is comprised of a combination hanger and clamp portion 26, a bag engaging portion 28 and a tube retaining portion 30 all formed integrally with each other and made of a semirigid or rigid material. Bag engaging portion 28 is of a U-shape and is dimensioned to fit snugly through an opening 32 formed in the top portion of bag 10.

Figure 2:
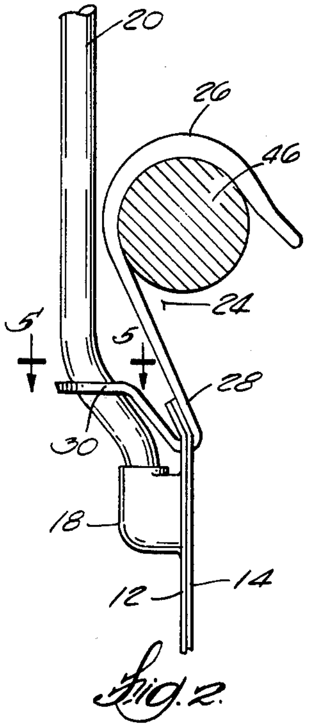
FIG. 2 is a side elevation view of the drainage bag shown in FIG. 1.
Figure 5:
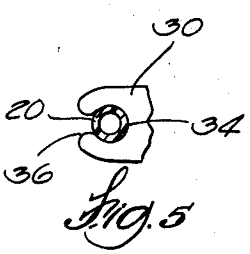
FIG. 5 is a fragmentary cross-sectional view taken along line 5—5 of FIG. 2.

Tube retaining portion 30 (FIG. 5) is comprised of a lip portion integral with and extending from one leg of bag engaging portion 28. The lip portion has a circular opening 34 therein and a cut-out portion 36 at the end thereof. When the combination hanger clamp member is in its operative position, as shown in FIG. 2, tube retaining portion 30 extends in a substantially horizontal direction. Thus, when tube 20 is pressed into opening 34 through cut-out portion 36, the retaining portion 30 functions to retain the tube in a substantially vertical position relative to the member 24.

Figure 3:
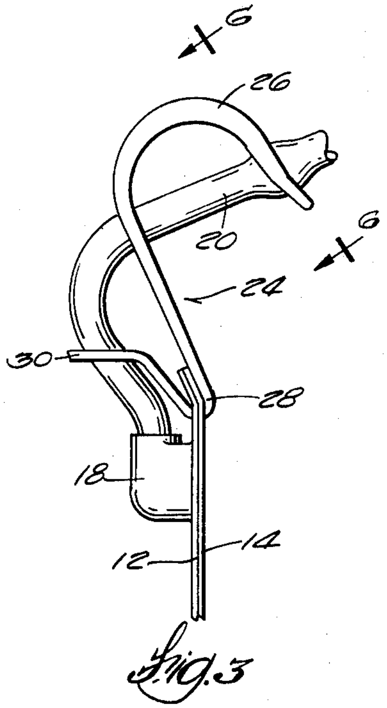
FIG. 3 is a view similar to FIG. 2 except with the inlet tube in its clamped or inoperative position.
Figure 6:
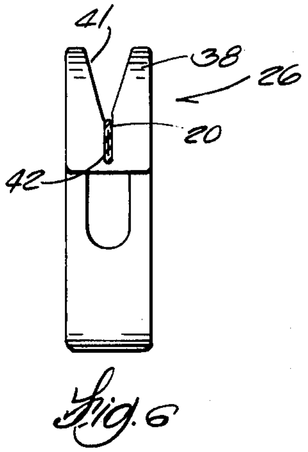
FIG. 6 is a fragmentary cross-sectional view taken along line 6—6 of FIG. 3.

As best shown in FIGS. 3 and 6, hanger and clamp portion 26 of member 24 is comprised of a substantially inverted U-shaped body portion 38 integral with and extending from the other leg of bag retaining portion 28. Body portion 38 has an elongated slot 40 therein which extends through the central portion thereof and is dimensioned to freely accommodate tube 20 therein. As best shown in FIG. 6, slot 40 tapers down as at 41 to a substantially narrower slot 42 at the tip portion of body 38. Slot 42 does not extend all the way through to the tip end of body 38 but terminates short of the tip at a point 44.

OPERATION

As shown in FIGS. 1 and 2, when the drainage bag 10 is in its operative or drainage position, the entire unit is supported in a vertical hanging position at the bedside of a patient, for example, by means of an appropriate support member 46, which cooperates with the combination hanger and clamp portion 26 of member 24 as shown. When in such position, inlet tube 20 must necessarily extend upwardly and out of engagement with narrow clamping slot 42. Tube 20 will thus be unrestricted to allow free flow of liquid from the patient through tube 20 and into bag 10.

Figure 4:
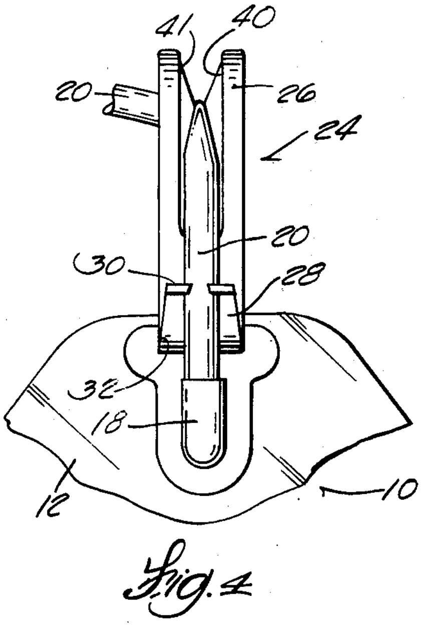
FIG. 4 is a view similar to FIG. 1 except with the inlet tube in its clamped or inoperative position.

When it becomes necessary to remove bag 10 from its operative position for patient transport or for any other reason, the bag is removed from support member 46 and tube 20 is moved from its operative unrestricted position as shown in FIGS. 1 and 2 to its inoperative clamped position as shown in FIGS. 3, 4 and 6. This is accomplished by manually gripping member 24 in one hand and tube 20 in the other hand and then moving tube 20 through large slot 40 and then forcing it through the tapered slot portion 41 until it becomes fully engaged in small clamping slot 42 as best shown in FIG. 6. When so positioned, the tube 20 will be fully flattened to completely restrict and shut off flow therethrough to thereby prevent any possibility of backflow and pressure to patient's bladder and of bacteria passing back up through tube 20 to the patient. The tube will remain in its clamped condition until the tube is manually forced back out of slot 42 in which event the inherent resiliency of the tube material will cause it to return to its original unrestricted condition.

It will be appreciated that when tube 20 is pressed into its restricted position, the tube will necessarily be bent downwardly and extend across hanger portion 26 through slot 40 as best shown in FIG. 3. Thus should the operator inadvertently attempt to restore the unit to its operative or drainage condition without first disengaging the tube from the clamping slot 42, the tube will interfere with the normal cooperation between the support member 46 and the hanger portion 26 and thus remind the operator to remove the tube from the clamping slot before restoring the unit to its operative position with a patient. This is important since a patient could be harmed by placing the drainage bag into use while the tube was in its clamped or restricted position.

We claim:

1. A combination hanger and clamp member for a drainage bag having an inlet tube connected to the top portion of the bag comprising:

a bag retaining portion adapted to engage and support the drainage bag in a substantially vertical hanging position; and a hanger clamp portion including an inverted U-shaped body portion adapted for hanging engagement with a support member, said inverted U-shaped body portion comprised of a pair of leg portions with one of said leg portions being integral with said bag retaining portion and the other of said leg portions terminating at a tip portion, said body portion having an elongated slot therein extending from one leg thereof to the other leg thereof, said slot being wide enough to freely accommodate said inlet tube therein and said slot tapering inwardly at one end thereof to a narrow clamping slot in which said tube can be forced and when so positioned will clamp the tube to a restricted position and thereby effectively prevent flow therethrough, said clamping slot located in said other leg portion of said U-shaped body portion and terminating at said tip portion of said other leg portion, said tube when in the clamped position extending across the U-shaped body portion of the hanger member to thereby effectively prevent the bag from being inadvertently place in its operable hanging position while the tube is still clamped shut.

2. A combination hanger and clamp member according to claim 1 in which said bag retaining portion is of an upright U-shape with one leg thereof connected to one leg of said inverted U-shaped body portion of said hanger clamp portion, said bag retaining portion dimensioned to extend through an opening in the top portion of the drainage bag.

3. A combination hanger and clamp member according to claim 2 in which said bag retaining portion has a lip portion integral with and extending from the other leg thereof, said lip having a circular opening therein and a cut-out portion at the end thereof, said opening adapted to receive and retain the inlet tube therein in a substantially vertical position when the drainage bag is in its vertical hanging position.

4. A combination hanger and clamp member for a drainage bag having an inlet tube connected to the top portion of the bag comprising:

a bag retaining portion adapted to engage and support the drainage bag in a substantially vertical hanging position, said bag retaining portion having an upright U-shape with the legs of the U-shaped portion extending upwardly when the drainage bag is in its hanging position;

a hanger clamp portion integral with and extending from one leg of said bag retaining portion, said hanger clamp portion including an inverted U-shaped body portion adapted for hanging engagement with a support member, said body portion having an elongated slot therein extending from one leg thereof to the other leg thereof, said slot being wide enough to freely accommodate said inlet tube therein and said slot tapering inwardly at one end thereof to a narrow clamping slot in which said tube can be forced and when so positioned will clamp the tube to a restricted position and thereby effectively prevent flow therethrough, said tube when in the clamped position extending across the U-shaped body portion of the hanger member to thereby effectively prevent the bag from being inadvertently placed in its operable hanging position while the tube is still clamped shut; and a tube retaining portion comprised of a lip portion integral with and extending from the other leg of said U-shaped bag engaging portion, said lip portion having a circular opening therein and a cut-out portion at the other end thereof, said opening adapted to receive and retain the inlet tube therein in a substantially vertical position when the drainage bag is in its vertical hanging position.

* * * * *